United States Patent [19]

Bolliger et al.

[11] 3,852,029

[45] Dec. 3, 1974

[54] STABLE CONCENTRATED SOLUTIONS OF DIRECT DYES AND PROCESS FOR THEIR MANUFACTURE

[75] Inventors: Hans Rudolf Bolliger, Mere; Herbert Alexander Potts, Bramhall, both of England

[73] Assignee: Ciba-Geigy AG, Basel, Switzerland

[22] Filed: Oct. 20, 1971

[21] Appl. No.: 191,065

[30] Foreign Application Priority Data

Oct. 22, 1970 Switzerland...................... 15607/70

[52] U.S. Cl.................................. 8/41 R, 8/7, 8/25, 8/26, 8/39, 8/85, 8/86, 8/88, 260/175, 260/377
[51] Int. Cl.............................................. D06p 1/06
[58] Field of Search.......... 8/39 R, 41 R, 85, 86, 88, 8/7, 25, 26, 82, 92, DIG. 7; 260/175, 377

[56] References Cited
UNITED STATES PATENTS

| | | | |
|---|---|---|---|
| 3,206,328 | 9/1965 | Shaw et al. | 117/138.8 |
| 3,480,378 | 11/1969 | Taube et al. | 8/39 |

FOREIGN PATENTS OR APPLICATIONS 1,572,030   6/1969   France

OTHER PUBLICATIONS

Diserens, "The Chemical Technology of Dyeing and Printing," Vol. II, 1951, p. 338.

*Primary Examiner*—Leon D. Rosdol
*Assistant Examiner*—Bruce H. Hess
*Attorney, Agent, or Firm*—Wenderoth, Lind & Ponack

[57] ABSTRACT

A process for the production of stable concentrated solutions of water-soluble tertiary ammonium salts of direct dyes, substantially free of inorganic salts is described by condensing in aqueous medium two mols of tertiary ammonium salts of identical or dissimilar azo and/or coloured anthraquinone sulphonic acid and/or carboxylic acid compounds, each of said compounds containing at least one primary or secondary amino group with one mol of a polyfunctional acylating agent in the presence of at least two mols of a tertiary amine with or without the addition of further auxiliary products. The thus obtained concentrated solutions are stable and are useful for the dyeing of cellulosic material, especially paper.

21 Claims, No Drawings

STABLE CONCENTRATED SOLUTIONS OF DIRECT DYES AND PROCESS FOR THEIR MANUFACTURE

The invention concerns stable highly concentrated solutions as dyestuff preparations, processes for their production, as well as for industrial purposes their use in making dye liquors which are useful for dyeing textile fibres and especially paper material.

It is known to manufacture highly concentrated liquid commercial forms of dyestuffs by dissolving the dyestuff powders or pastes, in suitable aqueous, organic or organic-aqueous media, whereby highly concentrated liquid dyestuff preparations are produced, which, as regards handling and use, offer advantages in several respects over the dry dyestuff preparations. The manufacture of such concentrated liquid preparations is, however, frequently associated with difficulties, since the dyestuffs used as starting products have in most cases been obtained by salting-out and therefore contain a considerable proportion of salts (eletrolytes), which at times are disadvantageous when manufacturing the liquid preparations, and the presence of which can have an adverse influence on the stability of such solutions.

A new process for the manufacture of stable, highly concentrated solutions of dyestuffs, especially direct dyes, substantially free of inorganic salts is now found, which is characterised by condensing in aqueous medium two mols of tertiary ammonium salts of identical or dissimilar azo and/or coloured anthraquinone sulphonic acid and/or carboxylic acid compounds, each of said compounds containing at least one primary or secondary amino group, with one mol of a poly-functional acylating agent in the presence of at least two mols of a tertiary amine with or without the addition of further auxiliary products.

The present process is above all suitable for the manufacture of highly concentrated solutions of azo dyestuffs as contain an aminoazo dyestuff bonded via a bridge member to the same or another azo or anthraquinone dyestuff containing at least one primary or secondary amino group.

As polyfunctional acylating agent is mentioned: phosgene as well as aliphatic dicarboxylic acid dihalides, such as oxalic acid dichloride, succinic acid dichloride and heterocyclic compounds containing at least two reactive halogen atoms, such as halogendiazines and halogentriazines, especially cyanuric chloride as well as dibromotriazines or dichlorotriazines.

As tertiary amines which can be used according to the invention there may, for example, be mentioned those of the formula

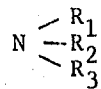

wherein $R_1$, $R_2$ and $R_3$ independently of each other denote methyl, ethyl, methoxyethyl or especially hydroxyethyl, and wherein $R_2$ and $R_3$ together with the nitrogen atom can also form a pyrrolidine, piperidine, morpholine or thiomorpholine ring. There are mentioned for example trialkylamines, such as trimethylamine or triethylamine, triethanolamine, monoethanoldimethylamine, trimethoxyethylamine or N-alkylated pyrrolidine, piperidine, N-methylpiperidine, morpholine, N-methylmorpholine, thiomorpholine, 1,4-diazabicyclo-(2,2,2)-octane or hexamethylenetetramine.

As further auxiliary agents, which can optionally be present are mentioned: the amides of inorganic or organic acids, preferably carboxylic acid amides, e.g., those of monobasic or dibasic carboxylic acids, such as the amides of carboxylic acids containing up to 8 carbon atoms, e.g., 2 to 4 carbon atoms, such as acetamide, propionic acid amide, and butyric acid amide, as well as malonic acid diamide. Urea and urea derivatives are particularly suitable; examples besides urea itself are substituted or unsubstituted alkyl-urea compounds such as methyl and ethyl urea, N,N'-dimethyl urea, and dihydroxyalkyl ureas. Further guanidine and its derivatives such as methyl guanidine are suitable. Also formamides such as alkylformamide, e.g., methyl- and dimethyl-formamide can be used as well as sulphonic acid amides or diamides.

Further auxiliary agents are for example antifoaming agents.

The production of the concentrated solutions is for example performed, that at least 2, preferably, however, 2.5 to 8 mols of a tertiary amine is added to the amino group containing azo and/or anthraquinone dyestuffs in aqueous medium, optionally together with further auxiliary until the solution reacts neutral. Thereafter, the acylating agent is gradually added (in the case of phosgene, by passing in the gas), and the pH is at the same time constantly kept weakly acid, neutral or very weakly alkaline by simultaneous dropwise addition of further tertiary amine. The reaction can be carried out at room temperature or preferably at slightly elevated temperature, for example between 20° and 70°C. Depending on the desired concentration of the preparation to be produced, the resulting solution can be further diluted or can be concentrated, for example by evaporation.

Highly concentrated solutions are obtained, which contain tertiary ammonium salts of dyestuffs preferably in such a species that all sulphonic acid and/or carboxylic acid groups are transferred to the tertiary ammonium salt, the dyestuff nucleus thereof being preferably of the formula

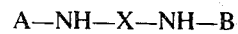

wherein A denotes the radical of an azo dyestuff, especially a monoazo dyestuff, B denotes the radical of a dyestuff which preferably also belongs to the azo, especially monoazo series, or also to the anthraquinone series, and X denotes a heterocyclic radical bonded via ring carbon atoms to the NH bridges, especially a triazine or diazine radical, a —CO— bridge or a bridge of the formula —CO—Y—CO—, wherein Y denotes the direct carbon to carbon linkage or an aliphatic radical preferably containing 1 to 4 carbon atoms.

The new process is particularly valuable for the manufacture of disazo dyestuffs of the formula

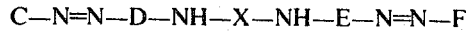

wherein C and F represent radicals of diazo components of the sulphobenzene or sulphonaphthalene series and D and E represent radicals of coupling components of the benzene, pyrazolone or naphthalene series, and wherein C and F and/or D and E can also be identical, and X denotes a —CO—, —COCO—, or —CO(CH$_2$)$_n$CO— bridge or a bridge of the formula

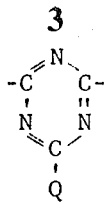

wherein n denotes an integer having a value of 1 to 4 and Q denotes a halogen atom, an etherified hydroxyl group or an optionally substituted amino group. Such disazo dyestuffs are, inter alia, described in French Pat. No. 1,572,030.

The highly concentrated solutions obtained according to the process of tertiary ammonium salts of direct dyes contain:

a. 10 to 50 parts, especially 25 to 40 parts, of tertiary ammonium salts of a condensation product of identical or dissimilar azo and/or anthraquinone sulphonic acid and/or carboxylic acid compounds, each of said compounds containing at least one primary or secondary amino group with a polyfunctional acylating agent, b. 10 to 100 parts of water, c. 5 to 25 parts of tertiary amine, and d. 0 to 20 parts of an auxiliary product.

The highly concentrated solutions prove stable even on prolonged standing and the dyestuff neither crystallises out nor decomposes. They are miscible in any ratio with water or, in part, also with suitable organic solvents, and can be easily dosed by metering. They are above all suitable for the manufacture of dyeing solutions for dyeing paper, especially in the mass, and for dyeing textile fibres, but can also be used for other purposes. Depending on the solubility of the dyestuff obtained according to the invention, the latter can, however, also be partially of wholly present as a stable dispersion.

In the non-limitative examples which follow, the parts, unless otherwise stated, denote parts by weight, the percentages denote percentages by weight and the temperatures are given in degrees Centigrade.

EXAMPLE 1

84.2 parts of 3-(4'-amino-2'-tolylazo)-1,5-naphthalene disulphonic acid (as free acid and substantially free of inorganic salt), 74.2 parts of metanilic azo-o-anisidine (as free acid and substantially free of inorganic salt), 100 parts of triethanolamine and 200 parts of water are charged to ] 9eaction vessel.

At 60° to 70° phosgene is introduced below the surface, simultaneously adding triethanolamine maintaining a pH-range between 5 and 6 until the reaction is complete.

The reaction mixture is allowed to cool and some triethanolamine hydrochloride formed screened off.

The total weight of solution is adjusted to 600 parts with water. A stable solution containing 25% by weight of the following dye results:

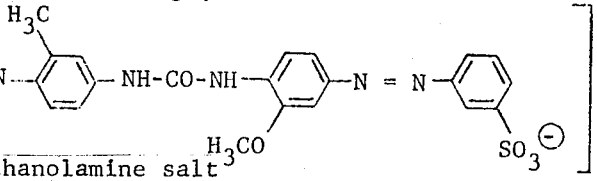

Using sodium carbonate in place of triethanolamine thus forming the sodium salt of the dye. When acylation is complete the total weight of solution must be increased to 1,875 parts with water to produce a stable solution containing 8% by weight of dye.

EXAMPLE 2

84.2 parts of 3-(4'-amino-2'-tolylazo)-1,5-naphthalene disulphonic acid (as free acid and substantially free of inorganic salt), 50 parts of triethanolamine and 100 parts of water are charged to a reaction vessel.

At 60° to 70° phosgene is introduced below the surface simultaneously adding triethanolamine maintaining pH between 5 and 6 until the reaction is complete.

The reaction mixture is allowed to cool and some triethanolamine hydrochloride formed screened off.

The total weight of solution is adjusted to 400 parts with water. A solution containing 21% by weight of the following dye results:

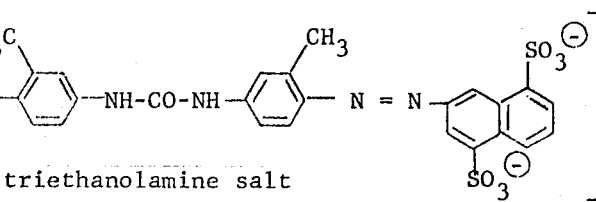

Using sodium carbonate in place of triethanolamine, thus forming the sodium salt of the dye. When reaction is complete the total weight of solution must be increased to 900 parts with water to form a stable solution containing 9% by weight of above dye.

EXAMPLE 3

61.4 parts of metanilic-azo-o-anisidine (as free acid and substantially free of inorganic salt), is condensed according to the process as for Example 2. A stable solution containing 16% by weight of the following dye results:

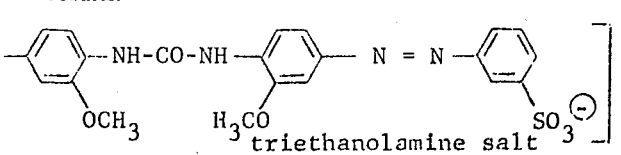

Using sodium carbonate in place of triethanolamine, thus forming the sodium salt of the dye. At the end of the reaction the total weight must be increased to 1,600 parts with water to form a stable solution containing 4% by weight of above dye.

EXAMPLE 4

68.6 parts of 1-hydroxy-7-phenylazo-6-sulphonic acid-3-aminonaphthalene (as free acid and substantially free of inorganic salt), is condensed according to the process as for Example 2, the final weight of solution being made up to 500 parts with water to form a stable solution containing 14% by weight of the following dye:

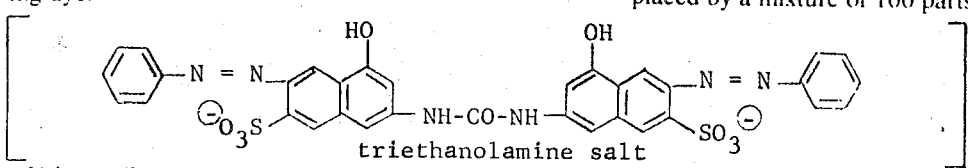

Using sodium carbonate in place of triethanolamine, thus forming the sodium salt of the dye. When the reaction is complete the total weight of solution must be increased to 7,000 parts with water to form a stable solution containing 1% by weight of above dye.

EXAMPLE 5

94.6 parts of 2-(1'-naphthylazo)-1-hydroxy-6-amino-naphthalene-3,5'-disulphonic acid (as free acid and substantially free of inorganic salt), are condensed according to the process as for Example 2, the final weight of solution being adjusted to 450 parts with water to form a stable solution containing 21% by weight of the following dye

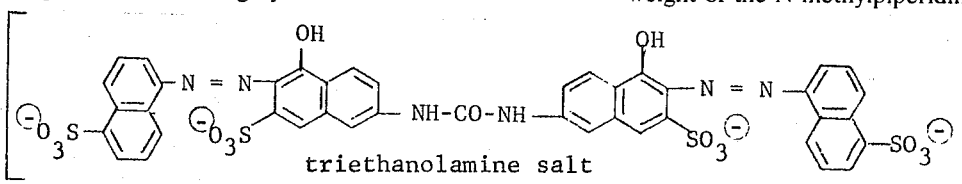

Using sodium carbonate in place of triethanolamine, thus forming the sodium salt of the dye. When the reaction is complete the total weight of solution must be increased, to 1,200 parts with water to form a stable solution containing 8% by weight of above dye.

EXAMPLE 6

30.7 parts of metanilic azo-o-anisidine (as free acid and substantially free of inorganic salt), 25.7 parts of 4-aminobenzeneazosalicylic acid (as partial hydrochloride and substantially free of other inorganic ions), 200 parts of water and 50 parts of triethanolamine are charged to a reaction vessel. At 60° to 70° phosgene is introduced below the surface, simultaneously adding triethanolamine, maintaining pH between 5 and 6, until the reaction is complete. 10 parts of urea and 10 parts of a surface active agent are added. The mixture is allowed to cool and some triethanolamine hydrochloride formed screened off. The total weight of solution is adjusted to 500 parts with water. A stable solution containing 12% by weight of the following dye results:

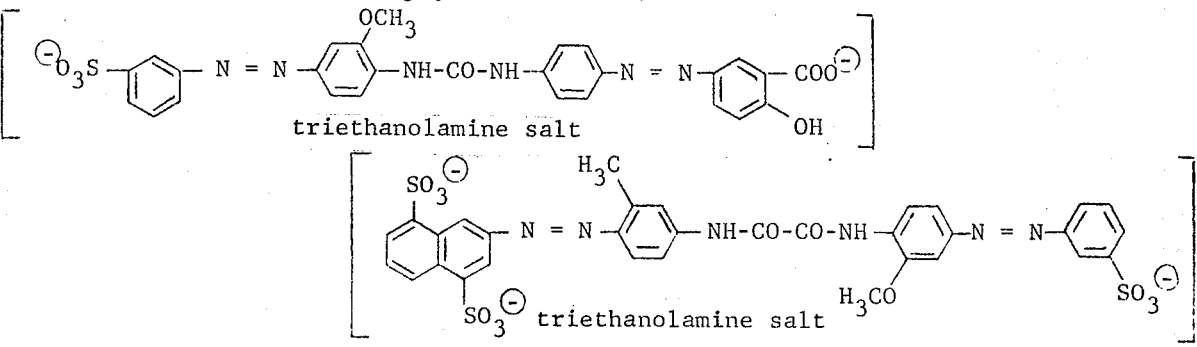

If in the above Example the 200 parts of water are replaced by a mixture of 100 parts of water and 80 parts of urea phosgenation resulted in a solution containing 18% of the above dye.

Using sodium carbonate in place of triethanolamine, thus forming the sodium salt of the dye. The total weight of solution at the end of the reaction must be increased to 38,280 parts with water to form a stable solution containing 0.15% by weight of above dye.

EXAMPLE 7

Process as for Example 2 but using N-methylpiperidine in place of triethanolamine. The final weight of solution must be adjusted to 600 parts with water to form a stable solution containing 14% by weight of the N-methylpiperidine salt of the dye.

EXAMPLE 8

Process as for Example 2, but using trimethylamine as a 30% solution in water in place of triethanolamine. The final weight of solution must be adjusted to 600 parts with water to form a stable solution containing 14% by weight of the trimethylamine salt of the dye.

EXAMPLE 9

Process as for Example 1, but using succinyl chloride in place of phosgene. 200 parts of succinyl chloride are added below the surface over 3 hours. The final weight of product is adjusted to 800 parts with water. A stable solution containing 20% by weight of the following dye results:

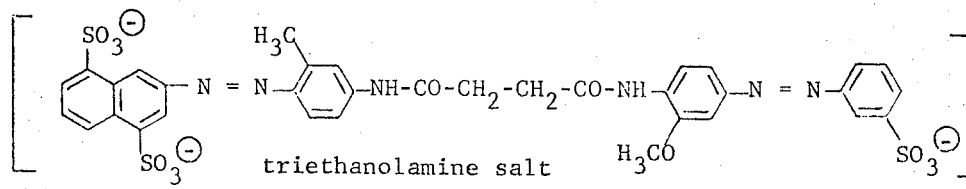

EXAMPLE 10

Process as for Example 1, but using oxalylchloride in place of phosgene. 300 parts of oxalylchloride are added over 3 hours below the surface. The final weight of product is adjusted to 1100 parts with water. A stable solution containing 14% by weight of the following dye results:

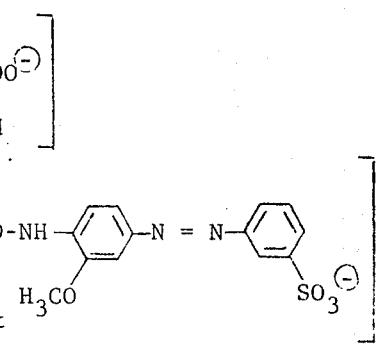

EXAMPLE 11

Process as for Example 5, but using N-methylmorpholine in place of triethanolamine. The total weight of product at the end of the reaction is adjusted to 600 parts with water. A stable solution containing 16% by weight of the N-methylmorpholine salt of the dye results.

EXAMPLE 12

Process as for Example 3, second paragraph, thus forming the sodium salt of the dye. The final reaction mass is made acid with hydrochloric acid and the free acid form of the dye is filtered off and washed free of inorganic salt with dilute hydrochloric acid.

10 parts of dye at 100% are slurried in a little water and heated to 70°. 30 parts of hexamethylenetetramine are added with 10 parts of urea. The total weight is adjusted to 100 parts with water. A stable solution containing 10% by weight of dye salt results.

EXAMPLE 13

90.2 parts of 1-amino-2-methoxy-4-(2'-naphthylazo-4',8'-disulphonic acid)-5-methylbenzene (as free acid and substantially free of inorganic salt), 150 parts of water, 50 parts of triethanolamine are charged to a reaction vessel. At 60° to 70° phosgene is introduced below the surface, simultaneously adding triethanolamine, maintaining the pH between 5 and 6 until the reaction is complete. 10 parts of urea and 10 parts of a surface active agent may be added. The mixtures is allowed to cool, and some triethanolamine hydrochloride formed screened off. The total weight of solution is adjusted to 400 parts with water. A stable solution containing 23.2% by weight of the following dye results:

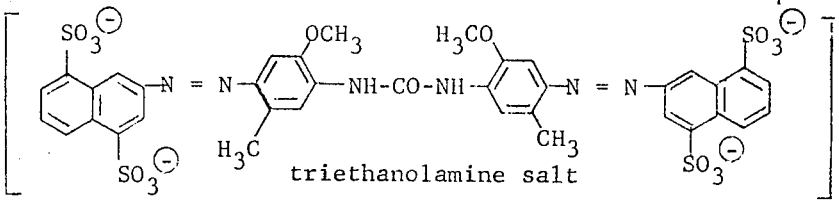
triethanolamine salt

Using sodium carbonate in place of triethanolamine, thus forming the sodium salt of the dye. The total weight of solution must be increased to 1,200 parts with water to produce a stable solution containing 7.7% by weight of above dye.

EXAMPLE 14

36.6 parts of cyanuric chloride, 75 parts of acetone, 35 parts of water, 125 parts of ice are charged together with 97.8 parts of 1-(4'-aminophenylamino)-4-aminoanthraquinone-3,3'-disulphonic acid (as free acid and substantially free of inorganic salt) in a reaction vessel, and the temperature is kept at about 15°. Triethanolamine is slowly added until pH becomes steady at 6 zo 7. The temperature is raised to 50° and 51.4 parts of 4-aminobenzeneazosalicylic acid (as partial hydrochloride and substantially free of other inorganic ions) is charged. Finally triethanolamine is slowly added until pH becomes steady at 6 to 7.

At 100° 42.0 parts of diethanolamine are charged and simultaneously triethanolamine is added maintaining pH between 6 and 7. Subsequently acetone is distilled off. When the reaction is complete, the pH of the solution is raised to 8.5 by addition of triethanolamine. 30 parts of urea and 20 parts of a surface active agend are charged. The liquid is cooled and some triethanolamine hydrochloride formed screened off. The total weight of solution is adjusted to 800 parts with water. A stable solution containing 22% by weight of the following dye results:

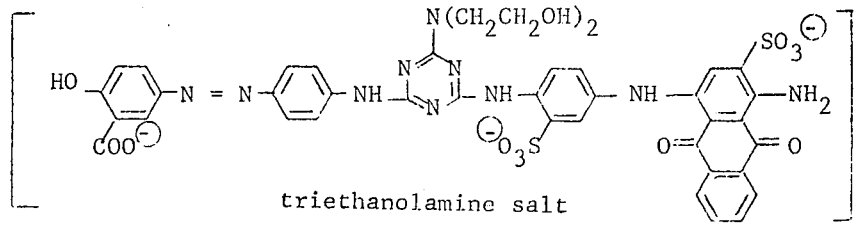
triethanolamine salt

Using sodium carbonate in place of triethanolamine, thus forming the sodium salt of the dye. The total weight of solution must finally be made up to 5,866 parts with water to form a stable solution containing 3% by weight of above dye.

To the Table

If the dyestuffs formed from the intermediates (colum II) and the acylating agents according to column IV in the presence of the acid acceptors according to column III following otherwise the procedure of Example 1, there are obtained dye solutions containing the dye salts in an amount as stated in column V of said Table. The shades of the dye solutions obtained are shown in column VI.

TABLE

| I | II | III | IV | V | VI |
|---|---|---|---|---|---|
| Ex. No. | Intermediates | Acid acceptor | Acylating agent | % Dye in solution | Shade |
| 15 | R₃ R₂ | Na₂CO₃ | Cl-CO-Cl | 8 | yellow |
|  |  | triethanolamine | Cl-CO-Cl | 25 | yellow |
|  |  | triethanolamine | Cl-CO(CH)₂Cl-CO-CO-Cl | 14 | yellow |
| 16 | R₃ R₃ | Na₂CO₃ | Cl-CO-Cl | 9 | yellow |
|  |  | triethanolamine | Cl-CO-Cl | 21 | yellow |
|  |  | N-methyl-piperidine | Cl-CO-Cl | 14 | yellow |
|  |  | trimethylamine | Cl-CO-Cl | 14 | yellow |

TABLE

| Ex. No. | Intermediates | | Acid acceptor | Acylating agent | % Dye in solution | Shade |
|---|---|---|---|---|---|---|
| 17 | $R_2$ | $R_2$ | $Na_2CO_3$ | Cl-CO-Cl | 4 | yellow |
|  |  |  | triethanolamine | Cl-CO-Cl | 16 | yellow |
|  |  |  | hexamethylene-tetramine | Cl-CO-Cl | 12 | yellow |
| 18 | $R_5$ | $R_5$ | $Na_2CO_3$ | Cl-CO-Cl | 1 | orange |
|  |  |  | triethanolamine | Cl-CO-Cl | 14 | orange |
| 19 | $R_6$ | $R_6$ | $Na_2CO_3$ | Cl-CO-Cl | 8 | red |
|  |  |  | triethanolamine | Cl-CO-Cl | 21 | red |
|  |  |  | N-methyl-morpholine | Cl-CO-Cl | 16 | red |
| 20 | $R_1$ | $R_2$ | $Na_2CO_3$ | Cl-CO-Cl | 0.2 | yellow |
|  |  |  | triethanolamine | Cl-CO-Cl | 12 | yellow |
| 21 | $R_3$ | $R_3$ | $Na_2CO_3$ | Cl-CO-Cl | 8 | yellow |
|  |  |  | triethanolamine | Cl-CO-Cl | 30 | yellow |
| 22 | $R_4$ | $R_1$ | triethanolamine | $C_3N_3Cl_3$ | 22 | green |

$R_1$ = 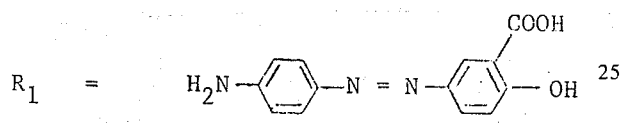

$R_2$ = 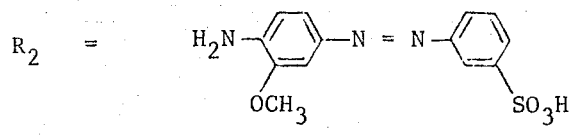

$R_3$ = 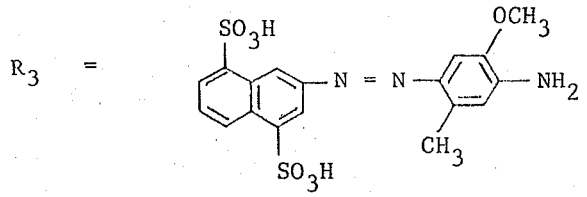

$R_4$ = 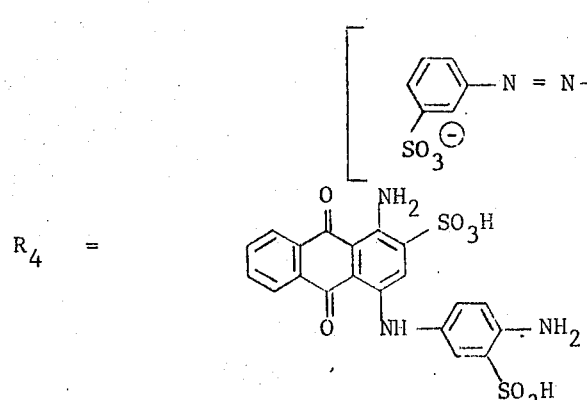

$R_5$ = 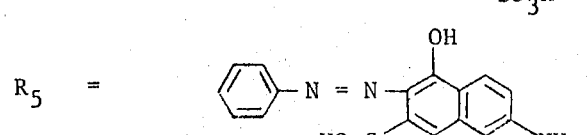

$R_6$ = 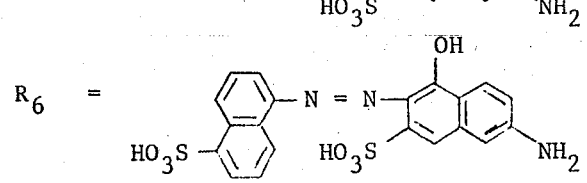

EXAMPLE 23

61 parts of the compound of the formula

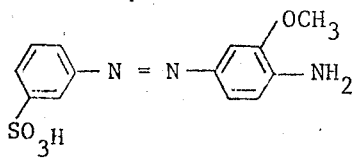

and 84 parts of the compound of the formula

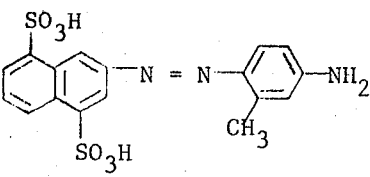

are stirred with 200 parts of water. Triethanolamine is added until a pH value of 7.0 is reached. The volume of the mixture is adjusted to 600 parts with water and phosgene is passed in at 55° to 60° for 12 hours. The pH value is kept at between 6.0 to 7.0 by regular addition of triethanolamine. The resulting concentrated solution of the yellow dyestuff of the formula

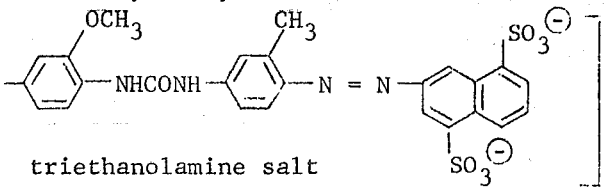

triethanolamine salt is stable and can, if necessary, be concentrated further by evaporation.

EXAMPLE 24

Measure sufficient volume of pulp to make a 10 g sheet, for example a 3% pulp containing a 50:50 mixture of bleached sulphite softwood and bleached hardwood sulphate containing 1½% rosin. Add ½ to 3% dye on the solid sheet weight either as straight 60% liquid or diluted liquid whilst stirring at high speed. Continue stirring for 3 minutes. Stand the coloured pulp 5 minutes, add 3% alum whilst stirring at high speed. Continue stirring for 3 minutes, stand for 5 minutes, dilute to suitable volume. Make paper sheept on the DECKLE, press between dry filter paper sheets twice, dry under slight pressure (i.e., on KODAK glazer). The rosin and alum may be omitted as the product has an excellent paper affinity.

We claim:

1. A process for the production of a stable concentrated solution of water soluble tertiary ammonium salts of direct dyes, substantially free of inorganic salts which comprises adding at least 2 mols of a tertiary amine of the formula

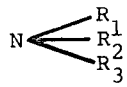

wherein $R_1$, $R_2$ and $R_3$ independently of each other denote methyl, ethyl, methoxyethyl or hydroxyethyl or wherein $R_2$ and $R_3$ together with the nitrogen atom to which they are attached form a pyrrolidine, piperidine, morpholine or thiomorpholine ring
   to an aqueous medium containing
   A. one mole of a member of the group consisting of
      (1) a tertiary ammonium salt of an azo sulphonic acid or carboxylic acid compound containing at least one primary or secondary amino group, and
      (2) a tertiary ammonium salt of a colored anthraquinone sulphonic acid or carboxylic acid compound containing at least one primary or secondary amino group, and (B) one mole of a member of the group consisting of (1) a tertiary ammonium salt of an azo sulphonic acid or carboxylic acid compound containing at least one primary or secondary amino group, and (2) a tertiary ammonium salt of a colored anthraquinone sulphonic acid or carboxylic acid compound containing at least one primary or secondary amino group, to form the tertiary ammonium salts of the said compounds, subsequently adding one mole of phosgene to the said aqueous medium to form the condensation product of the salts of said compounds with phosgene, the condensation reaction being conducted in the presence or absence of further auxiliary products.

2. A process according to claim 1 wherein each of the compounds (A) and (B) contains at least one primary amino group.

3. A process according to claim 1, wherein the tertiary amine used is of the formula

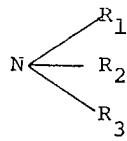

wherein $R_1$, $R_2$ and $R_3$ independently of each other denote methyl, ethyl, methoxyethyl or hydroxyethyl.

4. A process according to claim 1 wherein the tertiary amine is triethanolamine.

5. A process according to claim 1, wherein the condensation is carried out in the presence of further auxiliary products from the group of amides of inorganic or organic acids, antifoaming agents and mixtures thereof.

6. A process according to claim 5 wherein urea is present as auxiliary agent.

7. A process according to claim 1 wherein the condensation reaction is carried out at a temperature between 20° and 70°C.

8. A process according to claim 1 wherein 2.5 to 8 mols of a tertiary amine are used.

9. A process according to claim 2, wherein the compound (A) is a tertiary ammonium salt of a monoazo sulphonic acid or carboxylic acid compound and compound (B) is a tertiary ammonium salt of a monoazo sulphonic acid or carboxylic acid compound which is different from the compound (A).

10. A process according to claim 2, wherein the compound (A) is a tertiary ammonium salt of a monoazo sulphonic acid or carboxylic acid compound and the compound (B) is a tertiary ammonium salt of a colored anthraquinone sulphonic acid or carboxylic acid compound.

11. A process according to claim 2, wherein two mols of a tertiary ammonium salt of a monoazo sulphonic acid or carboxylic acid compound are employed as compound (A) and (B).

12. A stable concentrated solution of water-soluble tertiary ammonium salt of direct dye containing
   a. 10 to 50 parts of the condensation product of (A) one mole of a member of the group consisting of (1) a tertiary ammonium salt of an azo sulphonic acid or carboxylic acid compound containing at least one primary or secondary amino group, and (2) a tertiary ammonium salt of a colored anthraquinone sulphonic acid or carboxylic acid compound containing at least one primary or secondary amino group, and (B) one mole of a member of the group consisting of (1) a tertiary ammonium salt of an azo sulphonic acid or carboxylic acid compound containing at least one primary or secondary amino group, and (2) a tertiary ammonium salt of a colored anthraquinone sulphonic acid or carboxylic acid compound containing at least one primary or secondary amino group with (C) one mole of phosgene, the tertiary ammonium salt being one derived from a tertiary amine of the formula

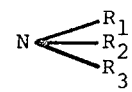

wherein $R_1$, $R_2$ and $R_3$ independently of each other denote methyl, ethyl, methoxyethyl or hydroxyethyl or wherein $R_2$ and $R_3$ together with the nitrogen to which they are attached form a pyrrolidine, piperidine, morpholine or thiomorpholine ring,
   b. 10 to 100 parts of water,
   c. 5 to 25 parts of tertiary amine of the above indicated formula, and
   d. 0 to 20 parts of an auxiliary product.

13. A stable concentrated solution according to claim 12 wherein each of the compounds (A) and (B) contains at least one primary amino group.

14. A stable concentrated solution according to claim 12 wherein the tertiary amine is of the formula

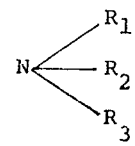

wherein $R_1$, $R_2$ and $R_3$ independently of each other denote methyl, ethyl, methoxyethyl or hydroxyethyl.

15. A stable concentrated solution according to claim 12 wherein the tertiary amine is triethanolamine.

16. A stable concentrated solution according to claim 12 wherein the component (d) is a member of the group of amides of inorganic or organic acids, antifoaming agents and mixtures thereof.

17. A stable concentrated solution according to claim 16 wherein the component (d) is urea.

18. A stable concentrated solution according to claim 13 wherein the compound (A) is a tertiary ammonium salt of a monoazo sulphonic acid or carboxylic acid compound and the compound (B) is a tertiary ammonium salt of a monoazo sulphonic acid or carboxylic acid compound different from compound (A).

19. A stable concentrated solution according to claim 13 wherein the compound (A) is a tertiary ammonium salt of a monoazo sulphonic acid or carboxylic acid compound and the compound (B) is a tertiary ammonium salt of a colored anthraquinone sulphonic acid or carboxylic acid compound.

20. A stable concentrated solution according to claim 13 wherein 2 mols of a tertiary ammonium salt of a monoazo sulphonic acid or carboxylic acid compound are employed as compounds (A) and (B).

21. A stable concentrated solution according to claim 12 containing a. 25 to 40 parts of a dyestuff selected from those of the formula

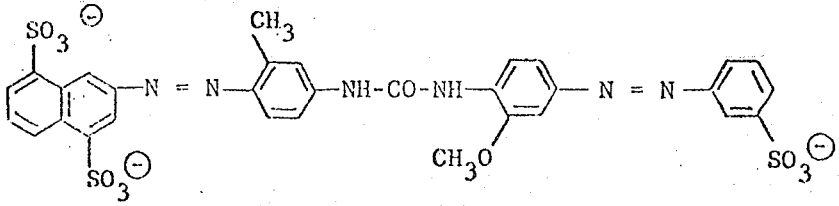

[triethanolamine salt]

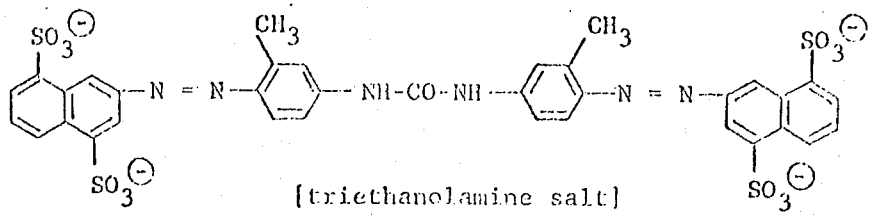

[triethanolamine salt]

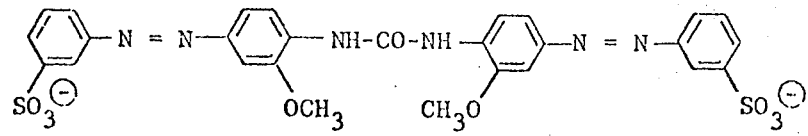

[triethanolamine salt]

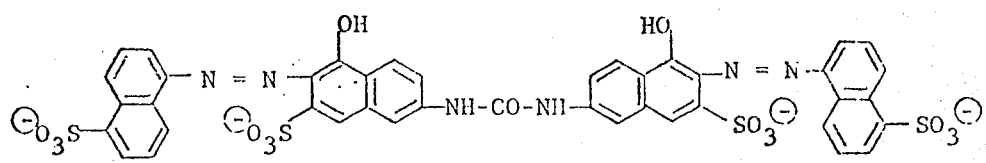

[triethanolamine salt]  and

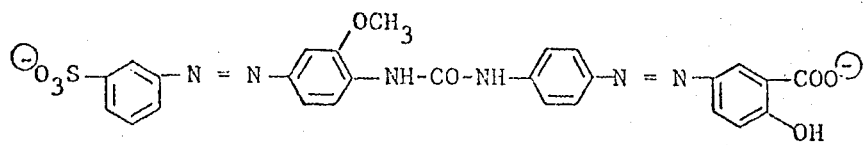

[triethanolamine salt]

b. 40 to 50 parts of water,
c. 5 to 15 parts of triethanolamine,
d. 0 to 10 parts of an amide of an inorganic or organic acid, and
e. 0 to 2 parts of an non-ionogenic or anionic antifoaming agent.

* * * * *